United States Patent
Potter et al.

(10) Patent No.: US 9,569,746 B2
(45) Date of Patent: Feb. 14, 2017

(54) CUSTOM FIT SALE OF FOOTWEAR

(75) Inventors: Daniel R. Potter, Forest Grove, OR (US); Allan M. Schrock, Portland, OR (US)

(73) Assignee: NIKE, Inc., Beaverton, OR (US)

(*) Notice: Subject to any disclaimer, the term of this patent is extended or adjusted under 35 U.S.C. 154(b) by 3645 days.

(21) Appl. No.: 10/099,685

(22) Filed: Mar. 14, 2002

(65) Prior Publication Data
US 2004/0024645 A1 Feb. 5, 2004

(51) Int. Cl.
*A43B 7/14* (2006.01)
*G06Q 30/00* (2012.01)
*G06Q 10/08* (2012.01)
*A43D 3/02* (2006.01)
*G06Q 30/06* (2012.01)

(52) U.S. Cl.
CPC .............. *G06Q 10/087* (2013.01); *A43D 3/02* (2013.01); *G06Q 30/0617* (2013.01); *G06Q 30/0621* (2013.01); *G06Q 30/0633* (2013.01)

(58) Field of Classification Search
USPC ... 705/26, 26.1, 26.43, 26.5, 26.8; 12/133 R, 12/142 T, 142 R, 145; 36/27, 37, 88, 100, 28; 700/95, 97, 117, 118
IPC ......... A61C 13/0004; G06Q 30/0621,30/0601, 30/06
See application file for complete search history.

(56) References Cited

U.S. PATENT DOCUMENTS

| | | | |
|---|---|---|---|
| 4,267,728 A | 5/1981 | Manley et al. | |
| 4,598,376 A | 7/1986 | Burton et al. | |
| 4,604,807 A | 8/1986 | Bock et al. | |
| 4,736,203 A | 4/1988 | Sidlauskas | |
| 4,800,657 A | 1/1989 | Brown | |
| 4,813,436 A | 3/1989 | Au | |
| 5,063,603 A | 11/1991 | Burt | |
| 5,123,169 A | 6/1992 | White et al. | |
| 5,128,880 A | 7/1992 | White | |
| 5,164,793 A | 11/1992 | Wolfersberger et al. | |
| 5,195,030 A | 3/1993 | White | |
| 5,206,804 A | 4/1993 | Theis et al. | |
| 5,216,594 A | 6/1993 | White et al. | |
| 5,231,723 A | 8/1993 | White et al. | |
| 5,237,520 A | 8/1993 | White | |
| 5,311,357 A | 5/1994 | Summer et al. | |
| 5,339,252 A * | 8/1994 | White et al. | .......... 700/98 |
| 5,351,303 A | 9/1994 | Willmore | |
| 5,361,133 A | 11/1994 | Brown et al. | |
| 5,483,601 A | 1/1996 | Faulkner | |

(Continued)

FOREIGN PATENT DOCUMENTS

| | | |
|---|---|---|
| WO | WO 90/05345 | 5/1990 |
| WO | WO 94/20020 | 9/1994 |

OTHER PUBLICATIONS

"Custom Fit Footwear", www.Digitoe.com, 1998, four pages.*

(Continued)

*Primary Examiner* — Andrew Joseph Rudy
(74) *Attorney, Agent, or Firm* — Banner & Witcoff, Ltd.

(57) ABSTRACT

A method whereby a customer may purchase footwear through a remote communication channel, and be assured that the purchased footwear will properly fit upon delivery. The customer purchases footwear by designating the last that is used to construct the footwear. A customer may identify a particular last based upon careful measurement of the customer's feet. A customer may also identify a last based upon previous experience with footwear constructed using the last.

10 Claims, 4 Drawing Sheets

(56) References Cited

U.S. PATENT DOCUMENTS

| | | | |
|---|---|---|---|
| 5,500,802 | A | 3/1996 | Morris et al. |
| 5,515,268 | A | 5/1996 | Yoda |
| 5,539,677 | A | 7/1996 | Smith |
| 5,640,779 | A * | 6/1997 | Rolloff et al. ............... 33/514.2 |
| 5,659,395 | A * | 8/1997 | Brown et al. ................ 356/601 |
| 5,671,279 | A | 9/1997 | Elgamal |
| 5,714,098 | A * | 2/1998 | Potter .................... A43B 3/26 12/142 R |
| 5,724,522 | A | 3/1998 | Kagami et al. |
| 5,753,931 | A | 5/1998 | Borchers et al. |
| 5,757,917 | A | 5/1998 | Rose et al. |
| 5,783,810 | A * | 7/1998 | Kelly, Jr. ..................... 235/385 |
| 5,785,909 | A * | 7/1998 | Chang ................ B29C 44/1233 264/161 |
| 5,790,256 | A * | 8/1998 | Brown et al. ................. 356/613 |
| 5,793,030 | A * | 8/1998 | Kelly, Jr. ..................... 235/385 |
| 5,878,401 | A * | 3/1999 | Joseph ............................ 705/22 |
| 5,879,725 | A | 3/1999 | Potter |
| 5,897,622 | A | 4/1999 | Blinn et al. |
| 5,930,769 | A | 7/1999 | Rose |
| 6,246,994 | B1 * | 6/2001 | Wolven et al. ................. 705/14 |
| 6,341,266 | B1 * | 1/2002 | Braun .............................. 705/7 |
| 6,449,878 | B1 | 9/2002 | Lyden |
| 6,463,351 | B1 * | 10/2002 | Clynch ................ A61F 2/5046 623/901 |
| 6,519,876 | B1 | 2/2003 | Geer et al. |
| 6,601,042 | B1 * | 7/2003 | Lyden ................ A43B 1/0081 36/27 |
| 6,853,981 | B1 * | 2/2005 | Radosevich et al. ........... 705/27 |
| 6,879,945 | B1 * | 4/2005 | Cook ............................... 703/2 |
| 7,016,867 | B2 * | 3/2006 | Lyden ................ A43B 1/0081 36/37 |
| 7,062,454 | B1 * | 6/2006 | Giannini et al. ................ 705/27 |
| 7,089,152 | B2 * | 8/2006 | Oda et al. ...................... 702/182 |
| 7,107,235 | B2 * | 9/2006 | Lyden ............................. 705/26 |
| 7,153,457 | B2 * | 12/2006 | Shor ..................... A43D 1/022 12/142 N |

OTHER PUBLICATIONS

"The Florsheim Shoe Company—Express Shop," Harvard Business School, © 1988, 14 pages.

"NGAGE digital sizing system," NIKE World Record, Feb./Mar. 1997, 2 pages.

"6 Steps to Ordering Shoe Lasts & Footwear From Digitoe," Digitoe, Inc., © Jun. 1988, 5 pages.

"Customizing for the Masses," Forbes, Oct. 16, 2000, 2 pages.

"Nike will let buyers help design shoes," The Oregonian, Oct. 21, 1999, 3 pages.

Excerpt from Digitoe, Inc.'s Website entitled "Custom Fit Footwear (a short story);" dated 1998, four pages.

Nikexpress Direct Sales over the Internet Expected to Reach 30% of Total Athletic Footwear Sales by Year 2003, The New York Times, Sep. 23, 1999, 1 page.

customatix.com, shoes designed by your, *u.s. men's measuring machine*, (date unknown, but prior to filing of this application), 1 page.

customatix.com, shoes designed by your, *u.s. women's measuring machine*, (date unknown, but prior to filing of this application), 1 page.

\* cited by examiner

| Customer 103A | 128.255 |
| --- | --- |
| Customer 103B | 68.004 |
| Customer 103C | Last 14, Length 9¼, Width EE |
| Customer 103D | 109.50 |
| ⋮ | ⋮ |

CUSTOM FIT SALE OF FOOTWEAR

This application is related to U.S. Pat. No. 5,714,098 to Daniel R. Potter, issued Feb. 3, 1998, which patent is incorporated entirely herein by reference. This application is also related to U.S. Pat. No. 5,879,725 to Daniel R. Potter, issued Mar. 9, 1999, which patent is incorporated entirely herein by reference as well.

FIELD OF THE INVENTION

The invention relates to the sale of custom-fitted footwear. More particularly, the invention relates to a method and data structure for selling footwear to individual customers. With the invention, a customer selects footwear based upon the last used to manufacture the footwear, so that the customer obtains footwear custom-fitted for the customer's feet.

BACKGROUND OF THE INVENTION

Consistently obtaining footwear that fits properly has long been a problem for footwear customers. Similarly, footwear manufacturers have long sought to ensure that customers receive properly fitting footwear, in order to maintain their customers' satisfaction. Even with modern technology, however, this goal has proven elusive. One problem with sizing footwear is that different models of footwear are typically manufactured using different lasts. Even if two different models of footwear are made by the same manufacturer and are labeled as the same size, they may still have different shapes. Thus, a customer who may be comfortable with the fit of a first model of footwear in, for example, a size 9 length and a size D width may not enjoy the fit of a second, different model of footwear having the same length and width sizes. For that second model of footwear, the customer may instead find that a size 8½ length and size E width provides the most comfortable fit.

Because of this inconsistency in the sizing of footwear, many potential footwear customers are reluctant to buy footwear without trying it on first to ensure a proper fit. These customers will not purchase footwear through the mail, by telephone, over the Internet, or through any other form of remote communication. Unfortunately, shoe manufacturers cannot make their footwear physically available in all possible models and sizes to all potential customers. For footwear manufactures that offer even a small range of footwear models, the cost of providing a sample of each model in each size to every footwear retailer would be prohibitively expensive. Further, most footwear retailers would not have the space to store and display a sample of each footwear model in each available size for more than a handful of footwear manufacturers. As a result, most shoe manufactures lose an unknown number of potential footwear sales each year, simply because customers cannot physically try on a desired model of footwear before purchase. Moreover, many of those customers who do purchase footwear remotely receive footwear that does not properly fit, and are dissatisfied with their purchases.

BRIEF SUMMARY OF THE INVENTION

Advantageously, the present invention provides a method whereby a customer may purchase footwear through a remote communication channel, and be assured that the purchased footwear will properly fit upon delivery. According to the invention, a customer purchases footwear by specifying the last that is used to construct the footwear. A customer may identify a particular last based upon careful measurement of the customer's feet. A customer may also identify a last based upon previous experience with footwear that was constructed using the last.

A customer may directly specify a last according to, for example, a last model number alone or a last model number in combination with a particular last size. Alternately, or additionally, the shoe provider may employ a data structure to correlate a customer's identity with one or more particular lasts that provide properly fitting shoes for the customer. The customer can then inherently select a particular last used to construct the footwear by providing his or her identity when ordering the model of desired footwear. By explicitly or inherently designating the last from which the footwear is constructed, the customer can ensure that the footwear is constructed to properly fit.

DETAILED DESCRIPTION OF THE INVENTION

Figure 1:
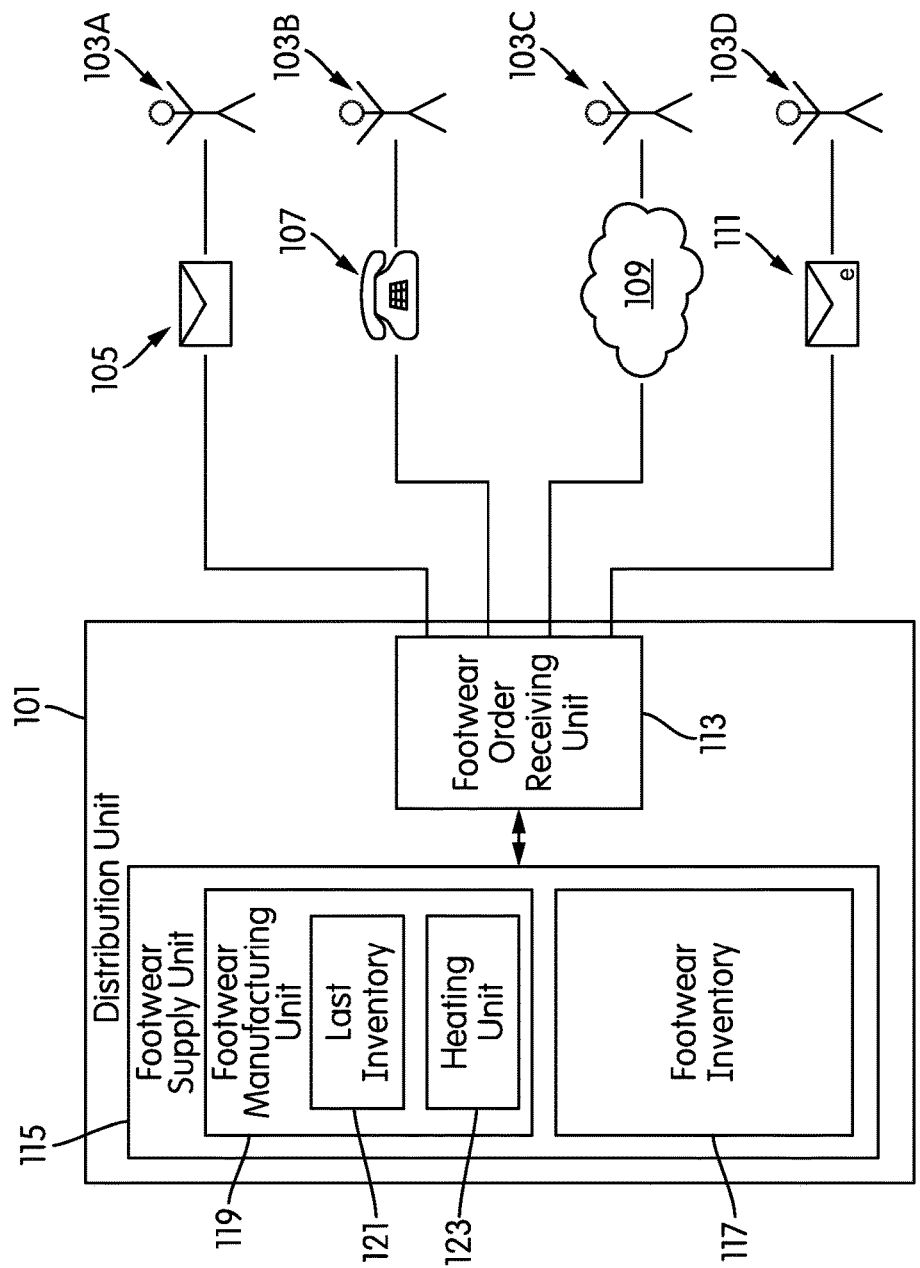
FIG. 1 illustrates a shoe distribution center for providing shoes to a plurality of customers according to one embodiment of the invention.

FIG. 1 illustrates a shoe distribution center 101 for providing shoes to a plurality of customers 103. As seen in this figure, the customers 103 can communicate with the distribution center 101 using one or more of a variety of remote communication channels, so that the customers 103 do not have to be physically present at the distribution center 101. Customer 103A, for example, may order shoes from the distribution center 101 by a parcel service 105, such as the U.S. Postal Service, United Parcel Service (UPS), Federal Express, or any other suitable parcel service. Customer 103B may submit an order for footwear to the distribution center 101 using a telephone service 107. As will be appreciated by those of ordinary skill in the art, the telephone service may be an ordinary PSTN telephone service, a wireless telephone service, or any combination thereof. Further, the customer 103B may submit the order using voice instructions (either to a person or to a recording device), or transmit written ordering instructions using a facsimile machine.

Some customers, such as customer 103C, may order footwear from the distribution center 101 via an electronic communication network 109. Perhaps the most well known example of such an electronic communication network 109 that may be used to order footwear from the distribution center 101 is the Internet, but those of ordinary skill in the art will appreciate that other network arrangements, such as intranets, local area networks, or other types of wide area networks may also be employed by customer 103C to order footwear from the footwear distribution center 101.

With this arrangement, the footwear distribution center 101 may provide the customer with one or more pages written in a markup language, such as the Hypertext Markup Language (HTML) or the Extensible Markup Language (XML) (i.e., a Website). The pages may, for example, display various footwear models currently available from the distribution center 101, along with ordering information instructing the customer 103C on the procedure to order footwear from the distribution center 101. The pages may also include one or more interactive questionnaires requesting ordering information from the customer 103C. Such information will typically include the customer's shipping address, billing information, and the footwear model desired by the customer. The questionnaires will also request the customer 103C to directly or indirectly specify the last used to manufacture the footwear, as will be explained in detail below. Using a computer with a software program for viewing the pages (i.e., a browser), the customer 103C can then select and order a particular model of footwear from the distribution center 101 by responding to the questionnaires over the communication network 109.

Other customers, such as customer 103D, may instead order footwear from the distribution center 101 through an electronic mail service 111. Of course, those of ordinary skill in the art will appreciate that the electronic mail service 111 can be implemented using an electronic communication network 109 as described above. The electronic mail service 111 may also be implemented using, for example, a direct communication connection with the distribution center 101 through a telephone call to the distribution center using a modem.

Still other customers may use another communication channel that permits a customer to remotely order footwear from the footwear distribution center 101. In fact, those of ordinary skill in the art will appreciate that various embodiments of the invention may be implemented using any combination of desired remote communication channels.

It will also be appreciated by those of ordinary skill in the art that the information used to order footwear may be obtained from any suitable source. As noted above, for example, a customer 103C may view ordering information provided on HTML pages through the communications network 109. Alternately, a customer may obtain ordering information through print advertisements, catalogs, television, or any other suitable source. The ordering information may include, for example, the footwear models available at the distribution center 101, the color schemes available for each model, price, or other characteristics of the footwear. Further, the ordering information may include customizing information, such as names or images that are available to be custom-applied to the footwear being ordered.

Turning now to the footwear distribution center 101, the center 101 includes a footwear order-receiving unit 113, which receives the footwear orders from customers 103 provided through the remote communication channels, and a footwear supply unit 115, which supplies footwear according to the customers' orders. More particularly, the footwear supply unit 115 includes a footwear inventory 117 containing one or more models of footwear in a variety of sizes, and a footwear manufacturing unit 121. The footwear manufacturing unit 121 has a last inventory 121 containing a plurality of lasts in different sizes, and a heating unit 123 for heating the lasts to modify footwear from the footwear inventory 117, as will be explained in detail below.

As previously noted, the footwear order-receiving unit 113 receives the footwear orders from customers 103. The order-receiving unit 113 may include a number of different components, depending upon the remote communication channels supported by the distribution center 101. For example, if the distribution center 101 communicates with customers 103 through an electronic communication network 109 (such as the Internet), then the receiving unit 113 may be include fully automated components for processing a customer's order. These components of the receiving unit 113 may be embodied, for example, by a server computer that receives footwear orders from the customer 103C and relays those orders on to the footwear supply unit 115. Similarly, if the footwear distribution center 101 supports remote communication with customers 103 through a telephone service 107, the order receiving unit 113 may include a fully automated voice menu system that allows customer 103B to order footwear using a telephone handset keypad or voice instructions in response to a series of audible prompts. If the operation of the footwear supply unit 115 is fully automated, then the customer 113 may order footwear without human intervention.

If the distribution center 101 supports communication channels that require a human interpretation of messages, then the order-receiving unit 113 will include human personnel. For example, with some embodiments of the footwear distribution center 101, the order-receiving unit 113 includes an operator to receive and understand voice instructions from a customer 103B over the telephone system 107. If the distribution center 101 receives written communications from customers 103 via a parcel system 105 or electronic mail system 111, then the order receiving unit 113 will include human readers to read and interpret footwear orders conveyed in the mail messages from the customers 103.

Referring back to the footwear supply unit 115, the footwear inventory 117 contains at least one model of footwear in a variety of sizes. As is known in the art, each pair of footwear is formed using a last, which defines the shape of the footwear. Additionally, the interior of each pair of footwear incorporates a moldable fit-component that allows each shoe to be remolded to lengths and widths differing from its original length and width. The last inventory 121 then includes a number of heatable lasts or mold cores that can be used to remold the length and width of the footwear in footwear inventory 117 to the length and width of the heatable last. In this manner, the shape of each piece of footwear in the footwear supply unit 115 can be resized using a last from the last inventory 121.

Preferably, the footwear inventory 117 includes the model of footwear in intermediate size increments. The last inventory 121 then includes lasts for molding footwear to length and width sizes that are not represented in the inventory 117. With one embodiment of the invention, for example, the footwear inventory 117 includes at least one style of stock shoes in relatively small size increments (e.g., standard half sizes) over a wide range of lengths. Thus, the stock shoes may range from length size 6 to size 14, and in full size increments for length sizes between 14 and 20. The stock shoes all have the same width (e.g., size "C"), or have one or more different widths for each length. The last inventory 121 then includes lasts for each desired length and width size increment (e.g., each ¼ length size increment for lengths ranging from size 6 to 13½ and each ½ length size increment for lengths ranging from size 13½ to 20, and each width increment for width sizes D, E and EE). The features and operation of such a footwear supply unit 115 are described in more detail in U.S. Pat. Nos. 5,714,098 and 5,879,725 to Daniel R. Potter, which were incorporated entirely herein by reference above.

With this arrangement, the footwear supply unit 115 can thus produce footwear in a variety of desired sizes by using a specific last size. For example, with the above embodiment, if a customer ordered a particular model of shoes with a length of size 8½ and a width of size "C," the footwear inventory 117 already includes footwear manufactured with a last of that shape. Thus, the footwear supply unit 115 could supply the ordered shoes directly out of the footwear inventory 117. On the other hand, if a customer ordered a particular model of shoes with a length of size 8¼ and a width of size "E," the footwear supply unit 115 could supply the shoes by reforming stock shoes (from the footwear inventory 117) with a last of size 8¼ and a width of size "E" (from the last inventory 121).

With some embodiments of the invention, the lasts in the last inventory 121 have the same overall shape as the lasts used to make the stock shoes in the footwear inventory 117. By using the same last (that is, the same last shape) to both initially construct shoes in the footwear inventory 117 and subsequently modify these shoes, a customer may easily determine a properly fitting shoe size for a particular model of shoe. For example, a customer may know that, with a last of shape A, a properly fitting shoe will have a length of size 8¼ and a width of size "E," whereas, with a last of shape B, a properly fitting shoe will a length of size 8½ and a width of size "C." If the lasts in the last inventory 121 and the lasts used to make the stock shoes in the footwear inventory 117 both include lasts of the same shape (for example, lasts of shape B), by specifying a particular last (that is, by specifying a last of a particular shape and size), a customer can confidently order custom-fitted footwear that will fit properly. Thus, with the above example, the customer will know that, when ordering a shoe constructed with the last of shape B, to order footwear with a length of size 8½ and a width of size "C," rather than a length of size 8¼ and a width of size "E."

Of course, other embodiments of the invention may employ differently shaped lasts to construct the footwear in footwear inventory 117 than are stored in last inventory 121.

With these embodiments, the footwear inventor 117, may, for example, keep a greater number of lasts with smaller size increments in the last inventory 121 than the previously described embodiments. Thus, the last inventory 121 may include lasts for each ¼ size increment from size 6 to 13½ and each ½ length size increment for lengths ranging from size 13½ to 20, and each width increment for width sizes D, E and EE. With these embodiments, if a customer orders a shoe manufactured with a particular last, the footwear supply unit 115 will be able to modify a stock shoe from the footwear inventory 117 with the desired last from the last inventor 121, even if the stock shoe had originally been manufactured with a differently shaped last.

With some embodiments of the invention, the footwear supply unit 115 may include footwear constructed with differently shaped lasts, while the last inventory 121 may include a variety of differently shaped lasts. For these embodiments, a last identifier can be used to uniquely identify each last employed to manufacture each item of footwear in the footwear inventory 117. The last identifier can also be used to uniquely identify each last in the last inventory 121. With this arrangement, a last identifier will identify a particular last by its overall shape, length, width, and any other relevant size information. Identifying each last with a unique last identifier allows a customer 103 to order footwear constructed with a specific last that will ensure that the footwear will fit properly. For example, the customer may specify that a particular last from the last inventory 121 to be used to reform the size of a shoe in the footwear inventory 117. Alternately, the customer may order existing footwear from the footwear inventory 117 based upon the last that was used to manufacture the footwear.

A variety of different formats may be employed for the last identifier. For example, the last identifier may be a single alphanumeric value that uniquely identifies a last. Thus, the number "128.255" may identify a last of a particular shape indicated by the number "12," having a length of size 8¼, and a width of size "E" (the fifth letter in the alphabet). Alternately, the last identifier may be made up of a number of discrete portions, each corresponding to a particular characteristic of a last. Thus, the same last discussed in the previous example may be identified by the last identifier "Last 12, length 8¼, width E."

Still further, if the same last shape is used to manufacture every size of a particular model of footwear, then that model of footwear can be used to inherently identify the last shape as part of the last identifier. For example, if every size of a footwear model "Air Potter" is originally constructed or reformed with the last of the particular shape indicated in the previous examples by the number "12," then the last identifier may be "Air Potter, length 8½ width E." Of course, those of ordinary skill in the art will appreciate that still other formats can be used to uniquely identify a last.

Figures 2, 5:
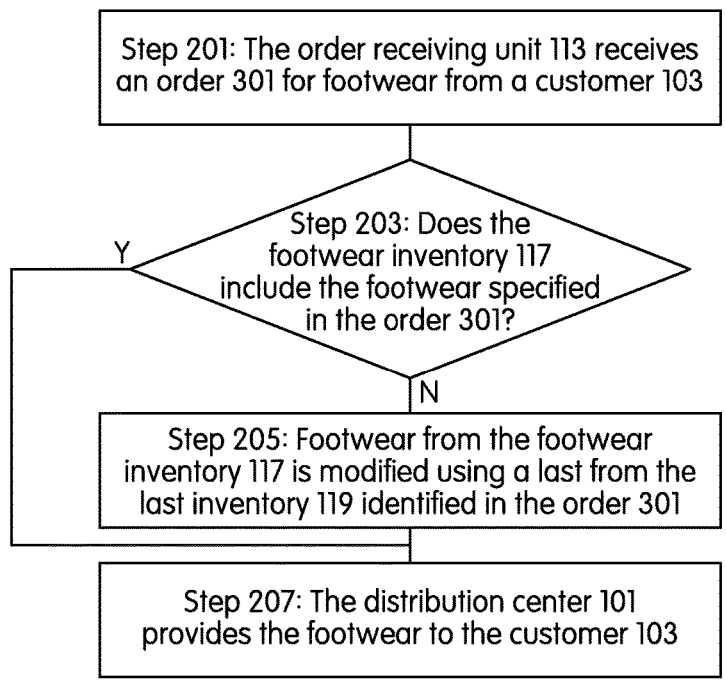
FIG. 2 shows a method for providing custom-fitted shoes according to one embodiment of the invention.
FIG. 5 shows a customer/last database according to an embodiment of the invention.

The operation of the distribution center 101 will now be described with reference to the method illustrated in FIG. 2. First, in step 201, the order-receiving unit 113 receives an order 301 for footwear from a customer 103. As noted above, the order 301 may be received using any remote communication channel supported by the distribution center 101, including channels using a parcel system 105, a telephone system 107, an electronic communication network 109 (for example, the Internet), an electronic mail system 111, or any other suitable remote communication channel.

Figure 3A:
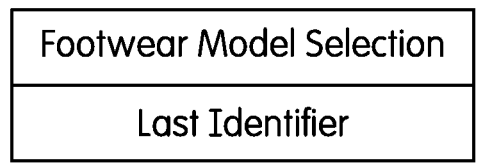
FIGS. 3A-3C illustrate information contained in orders for custom-fitted shoes according to various embodiments of the invention.

With some embodiments of the invention, the order 301 includes the ordering information shown in FIG. 3A. More particularly, the footwear order 301 includes a footwear model selection 303, designating the particular model of footwear from the footwear inventory 117 desired by the customer 103. The footwear model selection 303 may include, for example, the model type and a desired color scheme. The order 301 also includes a last identifier 305 to uniquely identify the last by which the customer 103 wishes to have the ordered shoes manufactured. The last identifier 305 identifies both the last shape and the last size, as noted above. Still further, the order may contain additional relevant information, such as, for example, a name, initials or an image to be custom-applied to the ordered footwear.

Figure 3B:

As also previously noted, with other embodiments of the invention the footwear model may inherently identify a single last shape. With these embodiments, the order 301 will include footwear model and size information, as shown in FIG. 3B. That is, the order 301 will include the footwear model selection 303, length size information 307, and width size information 309. This information together defines the particular last size and shape used to construct the ordered footwear.

In step 203, the distribution center 101 determines if the footwear inventory 117 includes the footwear specified in the order 301. More particularly, the distribution center 101 determines if the footwear inventory 117 contains footwear that has already been manufactured with the last specified in the order 301. It should be noted that this determination may be made by the order-receiving unit 117 upon receiving an order 301 from a customer 103, or by the footwear supply unit 115 after receiving a customer's order 301 relayed by the order-receiving unit 117.

If the footwear is in the footwear inventory 117, then the distribution center 101 provides the footwear to the customer 103 directly from the footwear inventory 117 in step 207. If the footwear specified in the order 301 is not a size carried in the footwear inventory 117, then, in step 205, the footwear is manufactured in the footwear supply unit 115 using the last identified in the order 301. That is, the last specified in the order 301 is selected from the last inventory 121, and used to modify the size of footwear already included in the footwear inventory 117. As noted above, this operation is discussed in detail in U.S. Pat. Nos. 5,714,098 and 5,879,725 to Daniel R. Potter, which were incorporated entirely herein by reference above. Once the footwear has been remolded to comply with the customer's order, then the distribution center 101 provides the footwear to the customer 103 in step 207.

It should be noted that the distribution center 101 can provide the ordered footwear to the customer 103 in step 207 using any suitable shipping method. For example, the distribution center 101 can mail the custom-fitted footwear directly to an address provided by the customer through a parcel service, such as the U.S. Postal Service, Federal Express, or United Parcel Service. Alternately, the distribution center 101 can ship the ordered footwear to a retail store, such as a store associated with the shoes' manufacturer. The customer 103 can then pick up the ordered footwear in person from retail store. The customer 103 may select the appropriate retail store from a list of available retail stores, or may simply allow the distribution center 101 to determine the closest retail store to the customer. Of course, still other techniques for shipping the ordered footwear to the customer will be apparent to those of ordinary skill in the art.

By using the distribution center 101 described above, a customer 103 need only identify a particular last that the customer knows will provide properly fitting footwear to confidently obtain custom-fitted footwear. As will be appreciated by those of ordinary skill in the art, a customer can determine which particular last or lasts that will provide properly fitting footwear in a variety of ways. A customer 103 may, for example, initially try on a variety of footwear to identify a particular last that, when used to manufacture a shoe, offers the best fit for the customer. After trying on a variety of footwear once to determine a suitable last, the customer need not try on footwear again, but may instead simply order footwear made with the particular last. Alternately, the customer 103 may employ a measurement process, such as a digital scan of the customer's feet, to determine an appropriate last that will provide the customer with properly fitting shoes. Regardless of the method of identifying the lasts that will provide custom-fitting footwear, once the customer 103 has identified the lasts, the customer 103 can employ the distribution center 101 to order footwear by referring to that last.

Figure 3C:
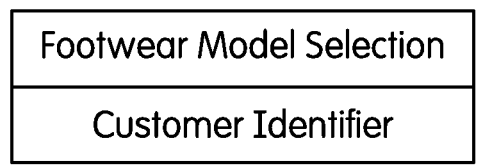
Figure 4:
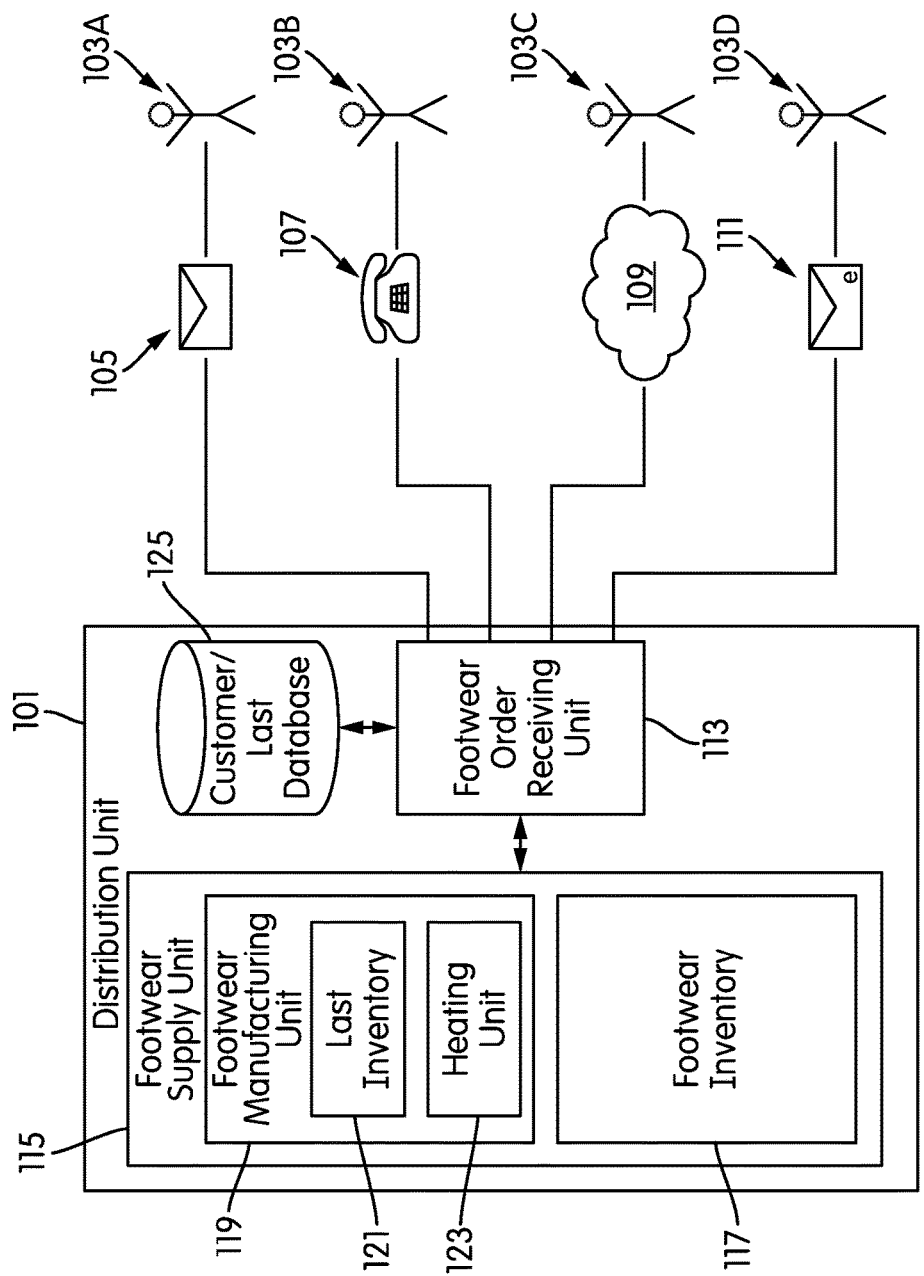
FIG. 4 illustrates a shoe distribution center for providing shoes to a plurality of customers according to another embodiment of the invention.

Yet another embodiment of the invention is illustrated in FIG. 4. In this figure, the distribution center 101 includes a customer/last database 125. As shown in FIG. 5, this customer/last database 125 includes a table associating each customer 103 with at least one last that will provide the customer with custom fitting shoes. For example, in the table, the customer 103A is associated with the last specified by the last identifier 128.255. Thus, the database 125 contains one or more records, with each record having a customer field identifying a customer and at least one last field identifying a last that will provide the customer with custom fitting footwear. With the customer/last database 125, the customer can omit providing a last identifier when ordering footwear. Instead, the customer need only identify himself or herself. The distribution center 101 can then use the customer/last database 125 to identify a particular last that will provide custom-fitted footwear for that customer, and manufacture the ordered footwear using the last corresponding to the customer. Thus, with this embodiment, the customer's order 301 may include only the footwear model selection 303 and the customer identification 311 as shown in FIG. 3C. As will be appreciated by those of ordinary skill in the art, the customer/last database 125 may be implemented using a software database, a written or printed table, or any other suitable medium for storing customer identity and last information.

In addition to storing customer identity and last information, the customer/last database 125 may also store any other type of information that may be useful to the customer or a shoe manufacturer associated with the distribution center 101. For example, for customers who are growing children, the customer/last database 125 may further store the age of the customer. This will allow the shoe manufacturer associated with the distribution center 101 to compile information for foot morphology studies regarding growth patterns, sizing information for specific age groups, and other footwear related projects.

Of course, those of ordinary skill in the art will appreciate that more than one last can provide a customer with custom-fitting footwear. Thus, with some embodiments of the invention, a customer may identify two or more lasts that will provide him or her with properly fitting footwear. The customer/last database 125 can then associate each last with that customer, and the distribution center 101 can determine which last to use when manufacturing shoes for the customer. For example, the customer may identify a first last that provides the customer properly fitting footwear when used to construct (or remold) hiking boots, and another, second last that provides the customer with properly fitting footwear when used to construct (or remold) basketball shoes. If the customer orders basketball shoes, the distribution center 101 will determine that the shoes should be remolded using the second last rather than the first last. Alternately, the customer can specify which of the suitable lasts should be used to construct or remold ordered footwear.

In addition, those of ordinary skill in the art will appreciate that a customer 103 can specify different lasts for the left and right shoes in a pair of footwear. For example, a customer may find that a shoe manufactured with a particular shape or size of last best fits his or her left foot, while a shoe manufactured with another shape or size of last best fits his or her right foot. Accordingly, various embodiments of the invention may allow a customer 103 to order footwear manufactured with different lasts used to manufacture the left and right shoes. Still further, with various embodiments of the invention, the customer/last database 125 can associate different lasts with a customer's left and right feet.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A shoe distribution center, comprising:
   an order receiving unit that receives orders from customers for footwear to custom fit the customer, each order identifying at least one last;

a footwear inventory containing a plurality of pieces of footwear in a variety of sizes, wherein an interior of each piece of footwear incorporates a moldable fit-component that allows that piece of footwear to be remolded to lengths and widths differing from that piece of footwear's original length and width; and a footwear manufacturing unit for remolding lengths and widths of pieces of footwear in the footwear inventory using the lasts identified in orders received by the order receiving unit.

2. The shoe distribution center recited in claim 1, wherein the footwear manufacturing unit includes:

a last inventory containing a plurality of lasts that can be used to remold lengths or widths of at least some of the pieces footwear in the footwear inventory; and a heating unit for heating the lasts to remold lengths or widths of at least some of the pieces footwear in the footwear inventory.

3. The shoe distribution center recited in claim 1, wherein the order receiving unit includes a server computer for receiving orders for custom fitting footwear over an electronic communication network.

4. The shoe distribution center recited in claim 1, wherein the order receiving unit includes an automated voice menu system for receiving orders for custom fitting footwear over a telephone service.

5. The shoe distribution center recited in claim 1, further comprising:

a customer/last database containing one or more customer records, wherein each record includes a customer field identifying a customer and at least one last field identifying a last associated with the customer.

6. The shoe distribution center recited in claim 1, wherein the order receiving unit receives orders from customers including orders identifying at least one last by a last model number.

7. A shoe distribution center, comprising:

an order receiving unit that receives orders from customers for footwear to custom fit the customer, each order identifying at least one last, wherein the order receiving unit includes a server computer for receiving orders for custom fitting footwear over an electronic communication network;

a footwear inventory containing a plurality of pieces of footwear in a variety of sizes, wherein an interior of each piece of footwear incorporates a moldable fit-component that allows that piece of footwear to be remolded to lengths and widths differing from that piece of footwear's original length and width;

a last inventory containing a plurality of lasts that can be used to remold the moldable fit-components of at least some of the pieces footwear in the footwear inventory; and a footwear manufacturing unit for remolding the moldable fit-components to change the lengths and widths of the interiors of pieces of footwear in the footwear inventory using the lasts identified in orders received by the order receiving unit.

8. The shoe distribution center recited in claim 7, wherein the footwear manufacturing unit includes a heating unit for heating the lasts to remold the moldable fit components of at least some of the pieces footwear in the footwear inventory.

9. The shoe distribution center recited in claim 7, further comprising:

a customer/last database containing one or more customer records, wherein each record includes a customer field identifying a customer and at least one last field identifying a last associated with the customer.

10. The shoe distribution center recited in claim 7, wherein the order receiving unit receives orders from customers including orders identifying at least one last by a last model number.

* * * * *